United States Patent
Jia et al.

(10) Patent No.: US 9,083,448 B2
(45) Date of Patent: Jul. 14, 2015

(54) PREAMBLE CAPTURE AND MEDIUM ACCESS CONTROL

(75) Inventors: Zhanfeng Jia, San Diego, CA (US); David Jonathan Julian, San Diego, CA (US); Amal Ekbal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1547 days.

(21) Appl. No.: 12/063,655

(22) PCT Filed: Oct. 26, 2007

(86) PCT No.: PCT/US2007/082733
§ 371 (c)(1),
(2), (4) Date: Feb. 12, 2008

(87) PCT Pub. No.: WO2009/054857
PCT Pub. Date: Apr. 30, 2009

(65) Prior Publication Data
US 2010/0157886 A1 Jun. 24, 2010

(51) Int. Cl.
*H04J 3/06* (2006.01)
*H04B 1/7183* (2011.01)
*H04B 1/7075* (2011.01)

(52) U.S. Cl.
CPC ............ *H04B 1/7183* (2013.01); *H04B 1/7075* (2013.01)

(58) Field of Classification Search
CPC .................... H04L 27/2655; H04J 13/0074
USPC ............. 370/503; 375/238, 146, 150; 342/50; 455/403, 522, 41
See application file for complete search history.

(56) References Cited

U.S. PATENT DOCUMENTS

| | | | |
|---|---|---|---|
| 5,687,169 A | 11/1997 | Fullerton |
| 5,764,696 A | 6/1998 | Barnes et al. |
| 5,812,081 A | 9/1998 | Fullerton |
| 5,832,035 A | 11/1998 | Fullerton |
| 5,907,427 A | 5/1999 | Scalora et al. |
| 5,952,956 A | 9/1999 | Fullerton |
| 5,960,031 A | 9/1999 | Fullerton et al. |
| 5,963,581 A | 10/1999 | Fullerton et al. |
| 5,969,663 A | 10/1999 | Fullerton et al. |
| 5,995,534 A | 11/1999 | Fullerton et al. |
| 6,031,862 A | 2/2000 | Fullerton et al. |

(Continued)

FOREIGN PATENT DOCUMENTS

| | | |
|---|---|---|
| CN | 1902860 A | 1/2007 |
| EP | 1748571 | 1/2007 |

(Continued)

OTHER PUBLICATIONS

International Search Report—PCT/US2007/082733, International Search Authority—European Patent Office—Jul. 22, 2008.
Written Opinion—PCT/US2007/082733, International Search Authority—European Patent Office—Jul. 22, 2008.
Taiwan Search Report—TW097141110—TIPO—Oct. 18, 2011.

*Primary Examiner* — Wei Zhao
*Assistant Examiner* — Lionel Preval
(74) *Attorney, Agent, or Firm* — Paul S. Holdaway

(57) ABSTRACT

An apparatus and method for wireless communications configured to receive simultaneous transmissions from a plurality of wireless devices, with each of the transmissions having a reference signal, acquire the reference signals and, based on information obtained from the acquisition of the reference signals, select the transmission from one of the wireless devices for timing synchronization and decoding.

48 Claims, 5 Drawing Sheets

(56) References Cited

U.S. PATENT DOCUMENTS

| | | |
|---|---|---|
| 6,091,374 A | 7/2000 | Barnes |
| 6,111,536 A | 8/2000 | Richards et al. |
| 6,133,876 A | 10/2000 | Fullerton et al. |
| 6,177,903 B1 | 1/2001 | Fullerton et al. |
| 6,218,979 B1 | 4/2001 | Barnes et al. |
| 6,295,019 B1 | 9/2001 | Richards et al. |
| 6,297,773 B1 | 10/2001 | Fullerton et al. |
| 6,300,903 B1 | 10/2001 | Richards et al. |
| 6,304,623 B1 | 10/2001 | Richards et al. |
| 6,351,652 B1 | 2/2002 | Finn et al. |
| 6,354,946 B1 | 3/2002 | Finn |
| 6,400,307 B2 | 6/2002 | Fullerton et al. |
| 6,400,329 B1 | 6/2002 | Barnes |
| 6,421,389 B1 | 7/2002 | Jett et al. |
| 6,430,208 B1 | 8/2002 | Fullerton et al. |
| 6,437,756 B1 | 8/2002 | Schantz |
| 6,462,701 B1 | 10/2002 | Finn |
| 6,466,125 B1 | 10/2002 | Richards et al. |
| 6,469,628 B1 | 10/2002 | Richards et al. |
| 6,483,461 B1 | 11/2002 | Matheney et al. |
| 6,489,893 B1 | 12/2002 | Fullerton et al. |
| 6,492,904 B2 | 12/2002 | Richards |
| 6,492,906 B1 | 12/2002 | Richards et al. |
| 6,501,393 B1 | 12/2002 | Richards et al. |
| 6,504,483 B1 | 1/2003 | Richards et al. |
| 6,512,455 B2 | 1/2003 | Finn et al. |
| 6,512,488 B2 | 1/2003 | Schantz |
| 6,519,464 B1 | 2/2003 | Santhoff et al. |
| 6,529,568 B1 | 3/2003 | Richards et al. |
| 6,538,615 B1 | 3/2003 | Schantz |
| 6,539,213 B1 | 3/2003 | Richards et al. |
| 6,549,567 B1 | 4/2003 | Fullerton |
| 6,552,677 B2 | 4/2003 | Barnes et al. |
| 6,556,621 B1 | 4/2003 | Richards et al. |
| 6,560,463 B1 | 5/2003 | Santhoff |
| 6,571,089 B1 | 5/2003 | Richards et al. |
| 6,573,857 B2 | 6/2003 | Fullerton et al. |
| 6,577,691 B2 | 6/2003 | Richards et al. |
| 6,585,597 B2 | 7/2003 | Finn |
| 6,593,886 B2 | 7/2003 | Schantz |
| 6,606,051 B1 | 8/2003 | Fullerton et al. |
| 6,611,234 B2 | 8/2003 | Fullerton et al. |
| 6,614,384 B2 | 9/2003 | Hall et al. |
| 6,621,462 B2 | 9/2003 | Barnes |
| 6,636,566 B1 | 10/2003 | Roberts et al. |
| 6,636,567 B1 | 10/2003 | Roberts et al. |
| 6,636,573 B2 | 10/2003 | Richards et al. |
| 6,642,903 B2 | 11/2003 | Schantz |
| 6,661,342 B2 | 12/2003 | Hall et al. |
| 6,667,724 B2 | 12/2003 | Barnes et al. |
| 6,670,909 B2 * | 12/2003 | Kim ............................ 342/50 |
| 6,671,310 B1 | 12/2003 | Richards et al. |
| 6,674,396 B2 | 1/2004 | Richards et al. |
| 6,677,796 B2 | 1/2004 | Brethour et al. |
| 6,700,538 B1 | 3/2004 | Richards |
| 6,710,736 B2 | 3/2004 | Fullerton et al. |
| 6,717,992 B2 | 4/2004 | Cowie et al. |
| 6,748,040 B1 | 6/2004 | Johnson et al. |
| 6,750,757 B1 | 6/2004 | Gabig, Jr. et al. |
| 6,759,948 B2 | 7/2004 | Grisham et al. |
| 6,760,387 B2 | 7/2004 | Langford et al. |
| 6,762,712 B2 | 7/2004 | Kim |
| 6,763,057 B1 | 7/2004 | Fullerton et al. |
| 6,763,282 B2 | 7/2004 | Glenn et al. |
| 6,774,846 B2 | 8/2004 | Fullerton et al. |
| 6,774,859 B2 | 8/2004 | Schantz et al. |
| 6,778,603 B1 * | 8/2004 | Fullerton et al. .............. 375/238 |
| 6,781,530 B2 | 8/2004 | Moore |
| 6,782,048 B2 | 8/2004 | Santhoff |
| 6,788,730 B1 | 9/2004 | Richards et al. |
| 6,822,604 B2 | 11/2004 | Hall et al. |
| 6,823,022 B1 | 11/2004 | Fullerton et al. |
| 6,836,223 B2 | 12/2004 | Moore |
| 6,836,226 B2 | 12/2004 | Moore |
| 6,845,253 B1 | 1/2005 | Schantz |
| 6,847,675 B2 | 1/2005 | Fullerton et al. |
| 6,879,878 B2 | 4/2005 | Glenn et al. |
| 6,882,301 B2 | 4/2005 | Fullerton |
| 6,895,034 B2 | 5/2005 | Nunally et al. |
| 6,900,732 B2 | 5/2005 | Richards |
| 6,906,625 B1 | 6/2005 | Taylor et al. |
| 6,907,244 B2 | 6/2005 | Santhoff et al. |
| 6,912,240 B2 | 6/2005 | Kumar et al. |
| 6,914,949 B2 | 7/2005 | Richards et al. |
| 6,917,284 B2 | 7/2005 | Grisham et al. |
| 6,919,838 B2 | 7/2005 | Santhoff |
| 6,922,166 B2 | 7/2005 | Richards et al. |
| 6,922,177 B2 | 7/2005 | Barnes et al. |
| 6,925,109 B2 | 8/2005 | Richards et al. |
| 6,933,882 B2 | 8/2005 | Fullerton |
| 6,937,639 B2 | 8/2005 | Pendergrass et al. |
| 6,937,663 B2 | 8/2005 | Jett et al. |
| 6,937,667 B1 | 8/2005 | Fullerton et al. |
| 6,937,674 B2 | 8/2005 | Santhoff et al. |
| 6,947,492 B2 | 9/2005 | Santhoff et al. |
| 6,950,485 B2 | 9/2005 | Richards et al. |
| 6,954,480 B2 | 10/2005 | Richards et al. |
| 6,959,031 B2 | 10/2005 | Haynes et al. |
| 6,959,032 B1 | 10/2005 | Richards et al. |
| 6,963,727 B2 | 11/2005 | Shreve |
| 6,967,993 B1 * | 11/2005 | Miller ............................ 375/150 |
| 6,980,613 B2 | 12/2005 | Krivokapic |
| 6,989,751 B2 | 1/2006 | Richards |
| 7,015,793 B2 | 3/2006 | Gabig, Jr. et al. |
| 7,020,224 B2 | 3/2006 | Krivokapic |
| 7,027,425 B1 | 4/2006 | Fullerton et al. |
| 7,027,483 B2 | 4/2006 | Santhoff et al. |
| 7,027,493 B2 | 4/2006 | Richards |
| 7,030,806 B2 | 4/2006 | Fullerton |
| 7,042,417 B2 | 5/2006 | Santhoff et al. |
| 7,046,187 B2 | 5/2006 | Fullerton et al. |
| 7,046,618 B2 | 5/2006 | Santhoff et al. |
| 7,069,111 B2 | 6/2006 | Glenn et al. |
| 7,075,476 B2 | 7/2006 | Kim |
| 7,079,827 B2 | 7/2006 | Richards et al. |
| 7,099,367 B2 | 8/2006 | Richards et al. |
| 7,099,368 B2 | 8/2006 | Santhoff et al. |
| 7,129,886 B2 | 10/2006 | Hall et al. |
| 7,132,975 B2 | 11/2006 | Fullerton et al. |
| 7,145,954 B1 | 12/2006 | Pendergrass et al. |
| 7,148,791 B2 | 12/2006 | Grisham et al. |
| 7,151,490 B2 | 12/2006 | Richards |
| 7,167,525 B2 | 1/2007 | Santhoff et al. |
| 7,170,408 B2 | 1/2007 | Taylor et al. |
| 7,184,938 B1 | 2/2007 | Lansford et al. |
| 7,190,722 B2 | 3/2007 | Lakkis et al. |
| 7,190,729 B2 | 3/2007 | Siwiak |
| 7,206,334 B2 | 4/2007 | Siwiak |
| 7,209,724 B2 | 4/2007 | Richards et al. |
| 7,230,980 B2 | 6/2007 | Langford et al. |
| 7,239,277 B2 | 7/2007 | Fullerton et al. |
| RE39,759 E | 8/2007 | Fullerton |
| 7,256,727 B2 | 8/2007 | Fullerton et al. |
| 7,271,779 B2 | 9/2007 | Hertel |
| 7,373,135 B2 * | 5/2008 | Sugaya et al. ............... 455/403 |
| 7,515,924 B2 * | 4/2009 | Nanda et al. ................ 455/522 |
| 2003/0124979 A1 * | 7/2003 | Tanada et al. ............... 455/41 |
| 2005/0096074 A1 * | 5/2005 | Nanda et al. ................ 455/522 |
| 2008/0095215 A1 * | 4/2008 | McDermott et al. ......... 375/146 |
| 2009/0088089 A1 * | 4/2009 | Chandra et al. ............. 455/101 |

FOREIGN PATENT DOCUMENTS

| | | |
|---|---|---|
| JP | 2003333661 A | 11/2003 |
| JP | 2005328200 A | 11/2005 |
| JP | 2006515727 A | 6/2006 |
| JP | 2006352786 A | 12/2006 |
| JP | 2007510384 A | 4/2007 |
| KR | 20060107799 A | 10/2006 |
| WO | 2005043830 | 5/2005 |

* cited by examiner

PREAMBLE CAPTURE AND MEDIUM ACCESS CONTROL

BACKGROUND

1. Field

The present disclosure relates generally to wireless communications, and more specifically to various techniques for preamble capture and medium access control.

2. Background

Carrier Sense Multiple Access (CSMA) are widely used in wireless communication systems for medium access control. With CSMA, a wireless device senses the medium through energy detection and transmit only when the medium is free.

A common problem in wireless communications occurs when two or more wireless devices attempt to transmit data to the same receiving wireless device. In this case, one of the transmitting wireless devices tends to dominate the channel and transmits data continuously, while the other transmitting wireless device experiences a long delay and poor fairness. In CSMA systems, fairness is achieved by inserting radio silence intervals between consecutive transmissions so that other wireless devices can sense a free medium and begin their transmissions.

Carrier sense is difficult to implement in Impulse-Radio Ultra-Wideband (IR-UWB) systems because the transmission power is usually below noise level. Without carrier sense, the radio silence interval needs to be large with respect to the length of the frame transmissions. This tends to reduce the throughput of the system.

Accordingly, there is a need in the art for improved methods for facilitating medium access control and to achieve a high level of fairness among transmitting wireless devices in IR-UWB systems. These methods should be extendable to other wireless communication systems.

SUMMARY

In one aspect of the disclosure, an apparatus for wireless communications includes a wireless interface configured to receive simultaneous transmissions from a plurality of wireless devices, each of the transmissions having a reference signal, and a searcher configured to acquire the reference signals and, based on information obtained from the acquisition of the reference signals, select the transmission from one of the wireless devices for timing synchronization and decoding.

In another aspect of the disclosure, a method of wireless communications includes receiving simultaneous transmissions from a plurality of wireless devices, each of the transmissions having a reference signal, acquiring the reference signals, and selecting the transmission from one of the wireless devices for timing synchronization and decoding based on information obtained from the acquisition of the reference signals.

In yet another aspect of the disclosure, an apparatus for wireless communications includes means for receiving simultaneous transmissions from a plurality of wireless devices, each of the transmissions having a reference signal, means for acquiring the reference signals, and means for selecting the transmission from one of the wireless devices for timing synchronization and decoding based on information obtained from the acquisition of the reference signals.

In a further aspect of the disclosure, a computer-program product for wireless communications comprising simultaneously transmissions received from a plurality of wireless devices, with each of the transmissions having a reference signal, includes computer-readable medium comprising codes executable by at least one processor to acquire the reference signals, and select the transmission from one of the wireless devices for timing synchronization and decoding based on information obtained from the acquisition of the reference signals.

In yet a further aspect of the disclosure, a headset includes a wireless interface configured to receive simultaneous transmissions from a plurality of wireless devices, each of the transmissions having a reference signal, a searcher configured to acquire the reference signals and, based on information obtained from the acquisition of the reference signals, select the transmission from one of the wireless devices for timing synchronization and decoding; and a transducer configured to provide an audio output based on the selected transmission.

In another aspect of the disclosure, a watch includes a wireless interface configured to receive simultaneous transmissions from a plurality of wireless devices, each of the transmissions having a reference signal, a searcher configured to acquire the reference signals and, based on information obtained from the acquisition of the reference signals, select the transmission from one of the wireless devices for timing synchronization and decoding, and a user interface configured to provide an indication based on the selected transmission.

In yet another aspect of the disclosure, a sensing device for wireless communications includes a wireless interface configured to receive simultaneous transmissions from a plurality of wireless devices, each of the transmissions having a reference signal, a searcher configured to acquire the reference signals and, based on information obtained from the acquisition of the reference signals, select the transmission from one of the wireless devices for timing synchronization and decoding, and a sensor configured to provide data to the wireless interface for transmission.

It is understood that other aspects of the invention will become readily apparent to those skilled in the art from the following detailed description, wherein various aspects of the invention are shown and described by way of illustration. As will be realized, the invention is capable of other and different configurations and implementations and its several details are capable of modification in various other respects, all without departing from the scope of this disclosure. Accordingly, the drawings and detailed description are to be regarded as illustrative in nature and not as restrictive.

BRIEF DESCRIPTION OF THE DRAWINGS

Various aspects of a wireless communications system are illustrated by way of example, and not by way of limitation, in the accompanying drawings, wherein.

DETAILED DESCRIPTION

Figure 1:
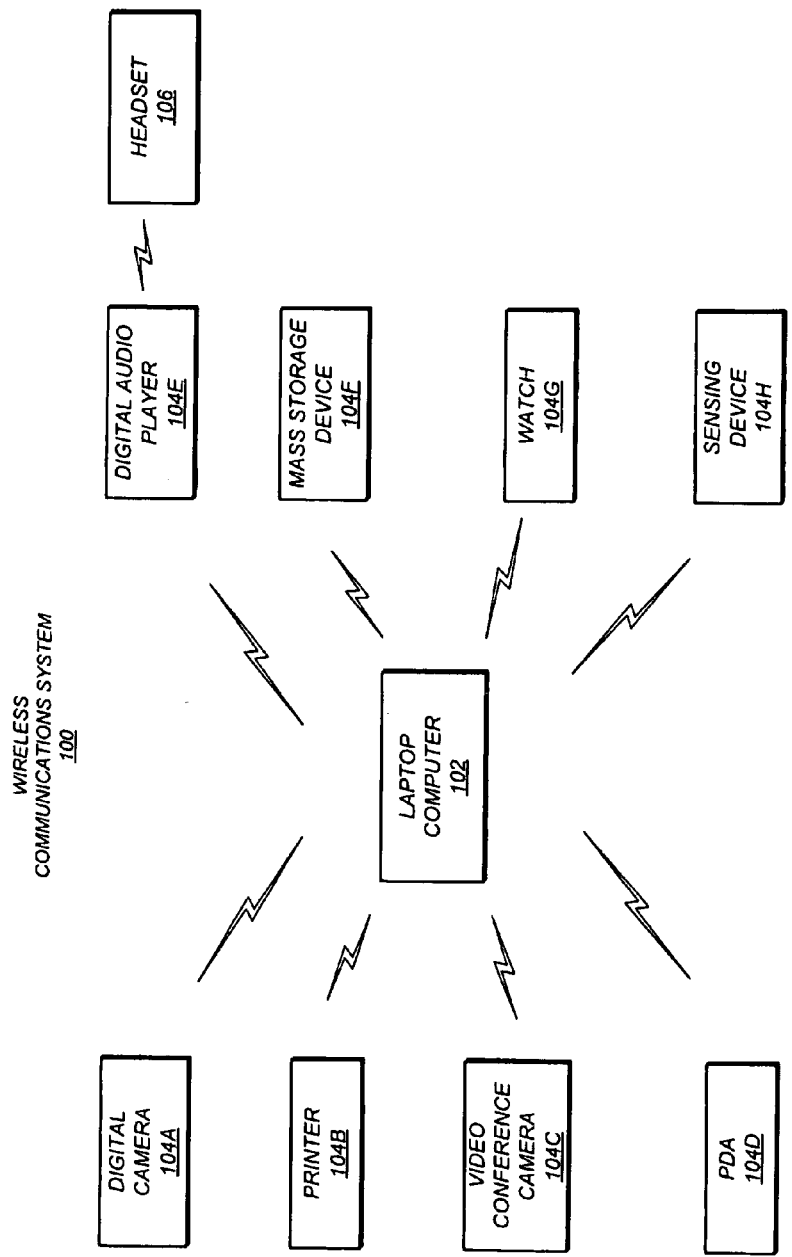
FIG. 1 is a conceptual diagram illustrating an example of a wireless communications system.

The detailed description set forth below in connection with the appended drawings is intended as a description of various configurations of the invention and is not intended to represent the only configurations in which the invention may be practiced. The detailed description includes specific details for the purpose of providing a thorough understanding of the invention. However, it will be apparent to those skilled in the art that the invention may be practiced without these specific details. In some instances, well-known structures and components are shown in block diagram form in order to avoid obscuring the concepts of the invention.

Various aspects of one or more methods and apparatuses are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect comprises at least one element of a claim.

In the following detailed description, various aspects of one or more methods and apparatuses will be described in the context of an IR-UWB system. While these aspects may be well suited for use with this application, those skilled in the art will readily appreciate that these aspects are likewise applicable to various other wireless communication systems. Accordingly, any reference to an IR-UWB system is intended only to illustrate various aspects, with the understanding that such aspects have a wide range of applications. By way of example, and without limitation, various aspects disclosed throughout this disclosure may be used with Bluetooth, 802.11, and other wireless protocols.

An example of a wireless communications system utilizing IR-UWB will now be presented. The wireless communications system may include a cluster of wireless devices in a home, office building, or other locality. The wireless communications system can generally be thought of as a consumer electronics wire replacement system, but is in no way limited to such applications. Each wireless device in the cluster may be capable of transmitting, receiving, or both. In the discussion that follows, the term receiving wireless device may be used to refer to a device that is receiving and the term transmitting wireless device may be used to refer to a device that is transmitting. Such a reference does not imply that the wireless device is incapable of performing both transmit and receive operations.

FIG. 1 is a conceptual diagram illustrating one example of a wireless communications system. The wireless communications system 100 is shown with a laptop computer 102 in communication with various other wireless devices 104. In this example, the computer 102 may receive digital photos from a digital camera 104A, send documents to a printer 104B for printing, communicate with a video conference camera 104C to support a live video feed, synch-up with e-mail on a Personal Digital Assistant (PDA) 104D, transfer music files to a digital audio player (e.g., MP3 player) 104E, back up data and files to a mass storage device 104F, set the time on a watch 104G, and receive data from a sensing device 104H (e.g., a medical device such as a biometric sensor, a heart rate monitor, a pedometer, an EKG device, etc.). Also shown is a headset 106 (e.g., headphones, earpiece, etc.) that receives audio from the digital audio player 104E. In one configuration of a headset 106, a microphone is also included to enable it to interface with a cellular telephone or other device requiring two-way communications.

In an alternative configuration of the wireless communications system 100 shown in FIG. 1, one or more wireless relay points may be used to extend the coverage of the system. By way of example, a relay point may be used to forward digital photos from the camera 104A to the computer 102 when the computer 102 is out of the transmission range of the camera 102A. In some configurations, multiple relay points may be used to establish a mesh network. In the mesh network, data from one of the wireless devices is routed from relay point to relay point until the data reaches its final destination at another wireless device. The relay points may be fixed or mobile. In the case of mobile relay points, the mesh network may be an adhoc network capable of reconfiguring itself as the relay points move around the wireless communications system. The relay points, whether fixed or mobile, may be stand alone devices, or alternatively, integrated into another wireless device. By way of example, a relay point may be integrated into the PDA 104D shown in FIG. 1 and, depending upon its location, may provide wireless routing between the computer 102 and the camera 104A.

In one configuration of the wireless communications system 100, the computer 102 provides an access point to a Wide Area Network (WAN) (i.e., a wireless network covering a regional, nationwide, or even a global region). One common example of a WAN is the Internet. In this example, the computer 102 shown in FIG. 1 may provide access to the Internet through an Internet Service Provider (ISP) via a telephone line, Integrated Services Digital Network (ISDN), Digital Subscriber Line (DSL), cable modem, fiber optic, or other suitable connection. Another example of a WAN is a cellular network that supports CDMA2000, a telecommunications standard that uses Code Division Multiple Access (CDMA) to send voice, data, and signaling between mobile subscribers. A cellular network is sometimes referred to as a Wireless Wide Area Network (WWAN). Another example of a WWAN is a cellular network that provides broadband Internet access to mobile subscribers, such as Evolution-Data Optimized (EV-DO) or Ultra Mobile Broadband (UMB), both of which are part of the CDMA2000 family of air interface standards.

In another configuration of the wireless communications system 100, the access point to the WAN may be a modem with an IR-UWB link to the computer 102. The modem may make a connection to the WAN through a Public Switched Telephone Network (PSTN), ISDN, DSL, cable, or fiber optics. Alternatively, or in addition to, the computer 102 may have an IR-UWB link to an Ethernet modem, or some other interface to a Local Area Network (LAN) (i.e., a network generally covering tens to few hundred meters in homes, offices buildings, coffee shops, transportation hubs, hotels, etc.).

Each wireless device in the cluster may be configured to continuously or periodically search for other wireless devices to establish a connection. If a wireless device detects another wireless device in the cluster, it may attempt to acquire that device through an acquisition procedure. The acquisition procedure includes the exchange of control messages that includes one or more parameters required to support communications between the two wireless devices.

Figure 2:
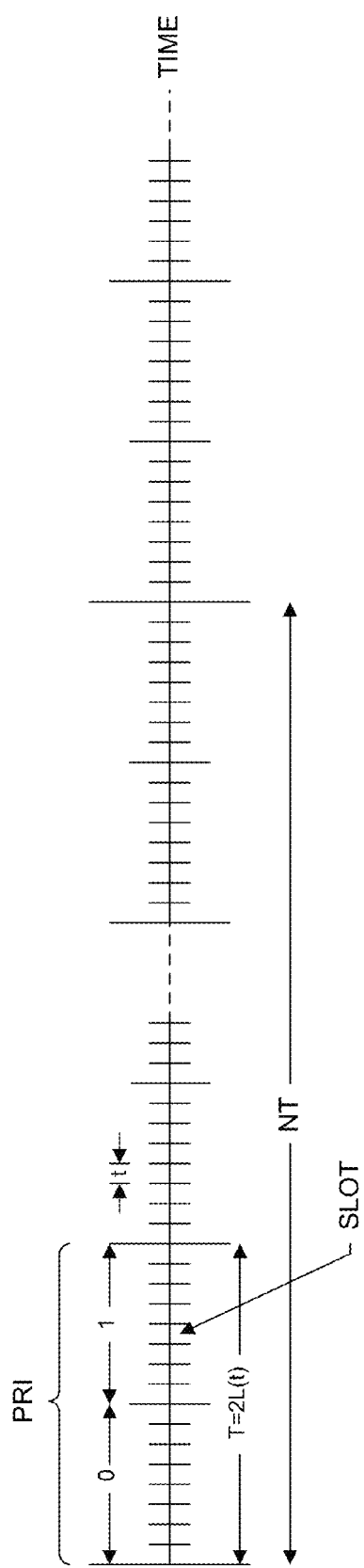
FIG. 2 is a timing diagram illustrating an example of a frame structure for a time hopping multiple access format is used to support UWB communications.

In one example of a cluster, a time hopping multiple access format is used to support IR-UWB communications. Time hopping is a spread spectrum technique in which a wireless device transmits a series of pulses with the period between pulses being varied. More specifically, and by way of example, a frame may be partitioned into a series of pulse repetition intervals (PRI) as shown in FIG. 2. Each PRI is denoted by a time period T. Within each PRI, the time is further divided into 2L time slots, with each time slot denoted by a time period t. A wireless device transmits a "bit" of information in each PRI by transmitting a pulse in one of the first L time slots if the bit is a "zero" or transmitting a pulse in one of the second L time slots if the bit is a "one." The time slot in which the wireless device transmits the pulse in each PRI is changed or randomized by a pseudo-random permutation sequence. The pseudo-random permutation sequence, which is sometimes referred to as a "spreading sequence," is established by a seed exchanged in the control messages during the acquisition procedure.

Figure 3:
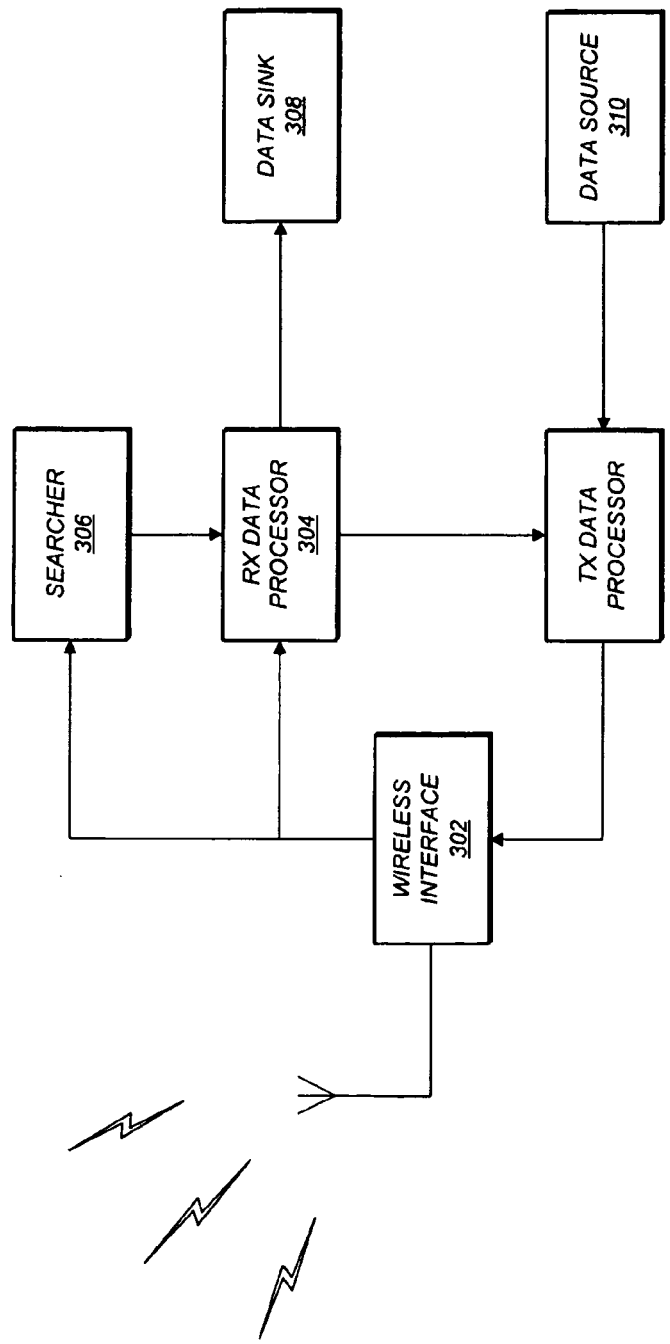
FIG. 3 is a conceptual block diagram illustrating an example of a wireless device.

FIG. 3 is a conceptual diagram illustrating an example of the functionality of a wireless device. In this example, the wireless device 300 is shown receiving multiple transmissions. In one example of a cluster, each transmission comprises a carrier signal modulated by a series of frames, where each frame includes a reference signal and a data payload. The reference signal may be a time hopping spread spectrum preamble containing multiple repetitions of a N-length preamble sequence, which is known, a priori, by the wireless device 300. Because the spreading sequence for the preamble may be different for each transmission, the wireless device 300 is able to distinguish between multiple transmitting devices. The data payload may include encoded data (e.g., Turbo encoded) that is mapped to coordinates on a signal constellation (i.e., digitally modulated) and then appended to the preamble before being spread and applied to the carrier signal for transmission over the wireless channel.

In this example, a wireless interface 302 performs a receiver function by converting the modulated carriers to a digital baseband signal. The digital baseband signal is divided into 2L signals, each being of N-length, and provided to a searcher 304, which performs a preamble capture algorithm. The preamble capture algorithm involves a search in time through the digital baseband signal in order to locate the preambles from each transmitting device. This may be achieved by correlating the digital baseband signal with locally generated preamble sequences. More specifically, and by way of example, a locally generated N-length spread spectrum preamble sequence for one of the transmitting devices may be correlated with the digital baseband signal. The preamble capture algorithm sequentially shifts the locally generated preamble sequence in phase as part of a systematic search through the digital baseband signal to find the sequence boundary for the corresponding preamble sequence. In this example, the locally generated preamble sequence is shifted in phase by one time slot t (see FIG. 2) between each correlation. Other phase shifts may be used depending on a variety of factors. Shorter phase shift increments may increase correlation gain whereas longer phase shift increments may reduce search time. Those skilled in the art will be readily be able the performance tradeoffs to determine the optimal phase shift for the locally generated preamble sequence.

Once the locally generated preamble sequence has been sequentially shifted in phase over the entire digital baseband signal, the preamble capture algorithm then provides a locally generated preamble sequence for another transmitting device. Similarly, this preamble sequence is correlated with the digital baseband signal by sequentially shifting the preamble sequence in phase by t increments. This process continues until all known preamble sequences are correlated with the digital baseband signal.

Figure 4:
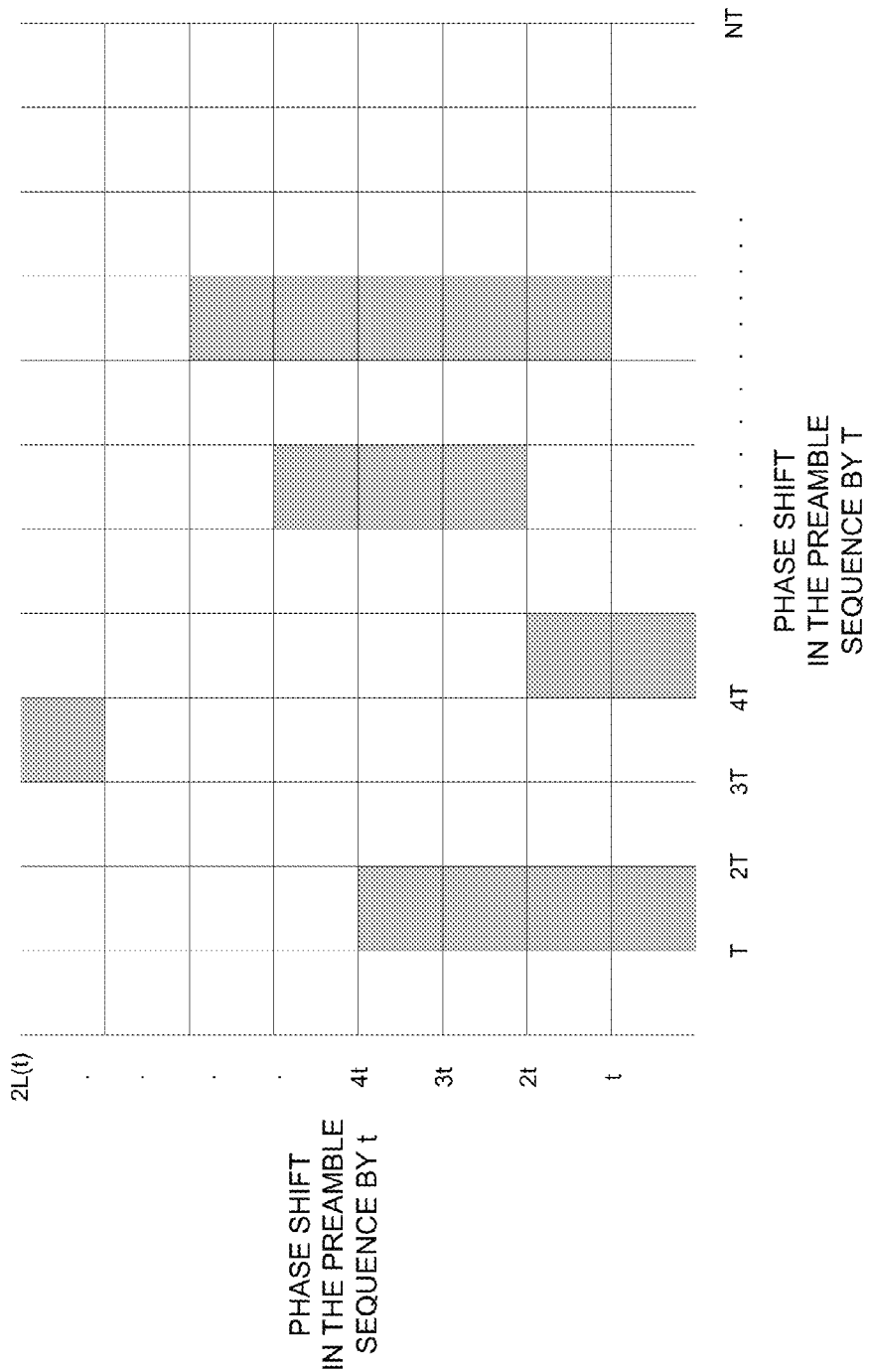
FIG. 4 is a conceptual diagram illustrating an example of the correlation results of a searcher in a wireless device.

The information generated by the preamble capture algorithm can be represented by the grid depicted in FIG. 4. Each block in the grid represents the correlation results of the locally generated N-length spread spectrum preamble sequence with one of the 2L N-length signals of the digital baseband signal. The location of the each block in the grid represents the phase shift of the locally generated preamble sequence. The y-axis represents a phase shift in the preamble sequence by t and the x-axis represents a phase shift in the preamble sequence by T. A block within the grid is shaded if the corresponding correlation results exceeds a threshold. Due to the delay spread in the UWB channel, the correlation of a single preamble sequence may result in more than one continuous blocks in the grid being shaded. By way of example, FIG. 4 shows four groups of blocks with different delay spreads.

With reference to FIGS. 3 and 4, the searcher 304 uses the information from the correlation results for medium access control. To accomplish this, the searcher 304 needs to distinguish between the received transmissions and select one or more transmissions for timing synchronization and decoding.

The searcher 304 may use various techniques to distinguish between multiple transmissions received by the wireless device 300. Perhaps the most straightforward approach is to distinguish multiple transmissions based on their respective preamble sequence. By way of example, if the correlation results from one locally generated preamble sequence can be represented with one group of blocks and the correlation results from a different locally generated preamble sequence can be represented by another group of blocks, then the received preamble sequences belong to two different transmissions.

Another technique that may be employed by the searcher 304 to distinguish between multiple transmissions received by the wireless device 300 is based on the patterns, of the correlation results. Patterns include the characteristics of the correlation results such as the amplitudes, the delay spread (i.e., the number of continuous shaded blocks in a group), and combinations thereof. By way of example, a transmission from a close transmitting device may result in a high amplitude and small delay spread, while a transmission from a distant device may result in a low amplitude and large delay spread. Using this technique, the searcher 304 can compare the patterns of previous transmissions and decide whether they are from the same transmitting devices.

Memory of the timing of previous transmissions is another technique that may be employed by the searcher 304 to distinguish between multiple transmissions. If a transmitting device sends consecutive frames, the searcher 304 may be able to identify the transmission provided that the timing doesn't change from frame to frame.

Once the searcher 304 distinguishes between the transmissions of multiple wireless devices, it can select a wireless device based on any suitable medium access criteria. Specific examples of medium access criteria may include quality of service (QoS) and fairness. In the former case, the searcher 304 may attempt to guarantee a certain QoS by acquiring and synchronizing with a known transmission when it is available at the appropriate time. In the latter case, the searcher 304 may want to acquire and synchronize with a different transmission than the previous one to achieve fairness among the wireless devices in the cluster. Alternatively, a fairness criterion may be implemented by performing the preamble capture algorithm right before the end of a previous transmission from one wireless device. If transmissions from other wireless devices are detected, the searcher 304 selects the transmissions from one of the wireless devices, either randomly or by some other means.

As an alternative to using QoS or fairness as a means for selecting a wireless device, the searcher 304 may be configured to make a random selection or select the wireless device with the maximum transmission power. Those skilled in the art will be readily able to determine the best selection criteria depending upon the particular application and the overall design constraints imposed on the overall system.

Once the searcher 304 selects the wireless device, the transmission timing from the preamble can be provided to a receive (RX) data processor 306. The RX data processor 306 generates a sequence of soft decisions for the data payload portion of the digital baseband signal. The soft decisions represent an estimate of the signal constellation points contained in the transmission. In the case of a Turbo encoded transmission, the soft decisions may be used to compute log-likelihood ratios that are used to decode the data payload that was originally transmitted.

The decoded data payload is provided to a data sink 308. The configuration of the data sink 308 for any particular application will depend on the nature of the wireless device 300. By way of example, the wireless device 300 may be a headset and the data sink 308 may be a transducer configured to provide an audio output to a user. As another example, the wireless device 300 may be a watch and the data sink 300 may be a user interface or display configured to provide an indication to a user.

In one configuration of a wireless device 300, an acknowledgement (ACK) is generated by the RX data processor 306 when the data payload is successfully decoded. The ACK is provided to a transmitter (TX) data processor 312 where it is punctured into a data stream from a data source 310. Similar to the data sink 308 discussed above, the data source 310 will also depend on the nature of the wireless device 300. By way of example, if the wireless device 300 is a headset, the data source 310 may a transducer configured to convert an audio input from a user to a data stream. As another example, the wireless device 300 may be a sensing device (e.g., a medical device such as a biometric sensor, a heart rate monitor, a pedometer, an EKG device, etc.) and the data source 310 may be a sensor.

The TX data processor 312 encodes the data from the data source 310 (e.g., Turbo encoded) and maps the encoded data to coordinates on a signal constellation (i.e., digitally modulated) to produce a series of modulation symbols. The modulation symbols are punctured with the ACKs from the RX data processor 306 and framed into data payloads, with a preamble attached to each payload. The frames are spread and then provided to the wireless interface 302 to modulate a carrier signal for transmission over the wireless channel.

In any given cluster, one or more wireless devices may be configured to receive only. By way of example, a headset for a digital audio player (e.g., MP3 player) is commonly restricted to a device that can receive audio files, but has no means to transmit. In a receive only wireless device, the data source 310 and TX data processor 312 would not be required. However, the wireless interface 312 may still be configured to transmit an ACK from the RX data processor 306 to indicate to the selected wireless device that the received transmission was successfully decoded.

In one configuration of a wireless device 300, the ACK generated by the RX data processor may include information indicating the number of times the preamble sequence has been acquired. This information may be used by the wireless device receiving this ACK to backoff its next transmission.

The searcher 306 may be implemented using software, hardware, or a combination of both. By way of example, the searcher 306 may be implemented with one or more integrated circuits (IC), either alone or in common with other processing functions (e.g., RX data processor, TX data processor, etc.). An IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the general purpose processor may be any conventional processor, controller, microcontroller, or state machine. The searcher 306 may also be implemented as a combination of computing devices, e.g., a combination of a DSP and a microprocessor, a plurality of microprocessors, one or more microprocessors in conjunction with a DSP core, or any other such configuration.

The code or instructions may be embodied in one or more machine-readable media to support software applications. Software shall be construed broadly to mean instructions, programs, code, or any other electronic media content whether referred to as software, firmware, middleware, microcode, hardware description language, or otherwise. Machine-readable media may include storage integrated with a processor, such as might be the case with an ASIC. Machine-readable media may also include storage external to a processor, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device. In addition, machine-readable media may include a transmission line or a carrier wave that encodes a data signal. Those skilled in the art will recognize how best to implement the described functionality for the searcher 306. Moreover, in some aspects any suitable computer-program product may comprise a computer-readable medium or machine-readable medium comprising codes relating to one or more of the aspects of the disclosure. In some aspects a computer program product may comprise packaging materials.

Figure 5:
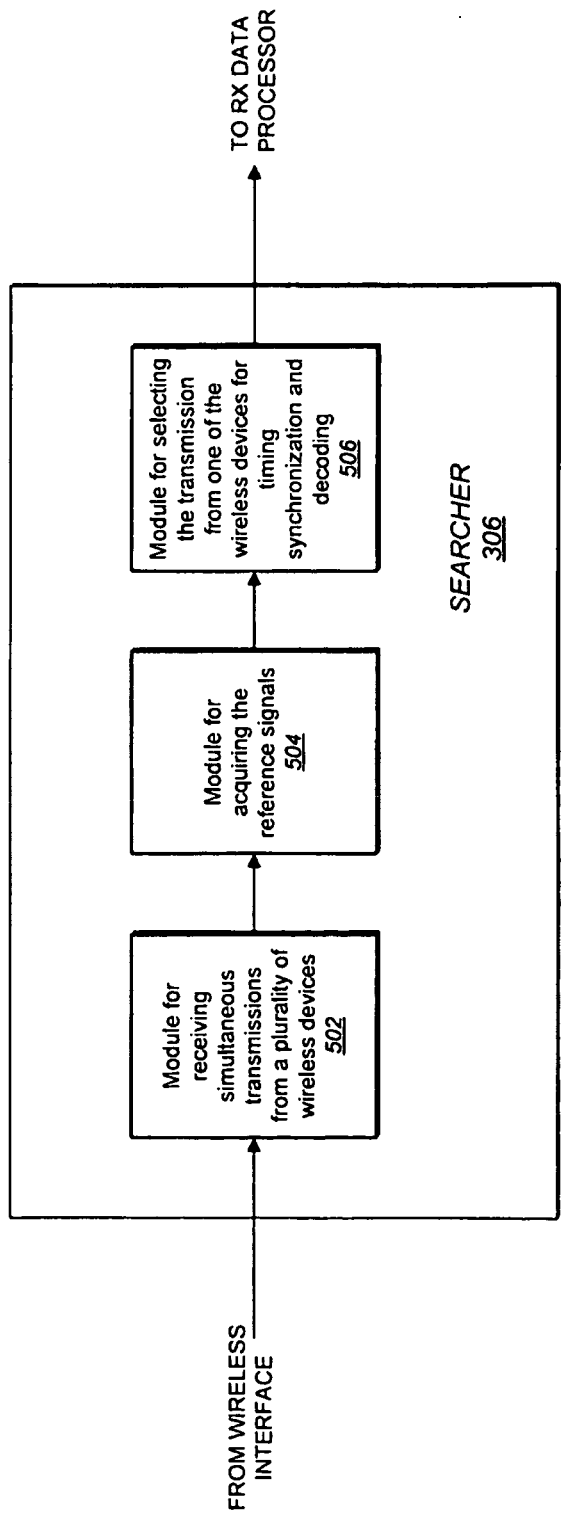
FIG. 5 is a conceptual block diagram illustrating an example of the functionality of a searcher in a wireless device.

FIG. 5 is a block diagram illustrating an example of the functionality of the searcher. The searcher 306 may include a module 502 for receiving simultaneous transmissions from a plurality of wireless devices, where each of the transmissions has a reference signal. The searcher 306 may also include a module 504 for acquiring the reference signals and a module 506 for selecting the transmission from one of the wireless devices for timing synchronization and decoding based on information obtained from the acquisition of the reference signals.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. An apparatus for wireless communications, comprising:
    a wireless interface configured to receive simultaneous transmissions from a plurality of wireless devices via a wireless communication medium, each of the transmissions having a reference signal; and
    a searcher configured to:
        acquire the reference signals;
        distinguish between the wireless devices by comparing information obtained from the acquisition of the reference signals with information obtained from the acquisition of reference signals of previously received transmissions from the wireless devices, wherein the information being compared comprises delay spread of each reference signal induced by the wireless communication medium;
        determine the delay spread by correlating each of the reference signals with a corresponding one of local signals at a plurality of time slots, the delay spread being characterized by a pattern of the time slots at which the correlation exceeds a threshold; and
        based on information obtained from the acquisition of the reference signals, select the transmission from one of the wireless devices for timing synchronization and decoding.

2. The apparatus of claim 1 wherein the reference signal in the transmission from each of the wireless devices includes a preamble sequence unique to that wireless device, and wherein the searcher is further configured to distinguish between the wireless devices based on the preamble sequences.

3. The apparatus of claim 1 wherein the information being compared comprises energy, and wherein the searcher is further configured to compare the energy from each of the transmissions with the energy from each of the previously received transmissions to distinguish between the wireless devices.

4. The apparatus of claim 1 wherein the information comprises timing, and wherein the searcher is further configured to distinguish between wireless devices by identifying said one of the wireless devices based on timing of a previously received transmission from the same wireless device.

5. The apparatus of claim 1 wherein the searcher is further configured to select the transmission from said one of the wireless devices whose previously received transmission was not selected.

6. The apparatus of claim 1 wherein the searcher is further configured to select the transmission based on at least one quality of service parameter.

7. The apparatus of claim 6 wherein the searcher is further configured to select the transmission from said one of the wireless devices based on the at least one quality of service parameter provided by said one of the wireless devices on a previously received transmission.

8. The apparatus of claim 1 wherein the searcher is further configured to acquire the reference signals before the end of a transmission from another one of the wireless devices being used for timing synchronization and decoding before the simultaneously transmissions from the wireless devices.

9. The apparatus of claim 1 wherein the searcher is further configured to generate an acknowledgement in response to selecting the transmission from said one of the wireless devices, and wherein the wireless interface is further configured to transmit the acknowledgement to said one of the wireless devices.

10. The apparatus of claim 9, further comprising a data source configured to generate application-specific data, and wherein the wireless interface is further configured to generate a data frame including both the application-specific data and the acknowledgement, and transmit the data frame to said one of the wireless devices.

11. The apparatus of claim 10, wherein the application-specific data comprises audio data or data generated by a sensor.

12. The apparatus of claim 1 wherein the wireless interface is further configured to transmit to said one of the wireless devices, the searcher being further configured to control the transmission by the wireless interface to said one of the wireless devices, receive an acknowledgement from said one of the wireless devices, and backoff a subsequent transmission by the wireless interface in response to the acknowledgement.

13. The apparatus of claim 1 wherein the searcher is further configured to select the transmission based on received energy from each of the simultaneous transmissions.

14. The apparatus of claim 1, wherein the searcher is further configured to select the transmission based on a fairness criterion with respect to previously received transmissions from the wireless devices.

15. The apparatus of claim 1, wherein each of the reference signals comprises a distinct preamble sequence, and each of the local signals comprises a distinct local preamble sequence.

16. The apparatus of claim 15, wherein correlating each of the reference signals with the corresponding one of the local signals comprises correlating the distinct preamble sequence of each of the reference signals with the distinct local preamble sequence of the corresponding one of the local signals.

17. A method of wireless communications, comprising:
    receiving simultaneous transmissions from a plurality of wireless devices via a wireless communication medium, each of the transmissions having a reference signal;
    acquiring the reference signals;
    distinguishing between the wireless devices by comparing information obtained from the acquisition of the reference signals with information obtained from the acquisition of reference signals of previously received transmissions from the wireless devices, wherein the information being compared comprises delay spread of each reference signal induced by the wireless communication medium;
    determining the delay spread by correlating each of the reference signals with a corresponding one of local signals at a plurality of time slots, the delay spread being characterized by a pattern of the time slots at which the correlation exceeds a threshold; and
    selecting the transmission from one of the wireless devices for timing synchronization and decoding based on information obtained from the acquisition of the reference signals.

18. The method of claim 17 wherein the reference signal in the transmission from each of the wireless devices includes a preamble sequence unique to that wireless device, and wherein the wireless devices are distinguished based on the preamble sequences.

19. The method of claim 17 wherein the information being compared comprises energy, and wherein the wireless devices are distinguished by comparing the energy from each of the transmissions with the energy from each of the previously received transmissions.

20. The method of claim 17 wherein the information comprises timing, and wherein the wireless devices are distinguished by identifying said one of the wireless devices based on timing of a previously received transmission from the same wireless device.

21. The method of claim 17 wherein the transmission from said one of the wireless devices is selected whose previously received transmission was not selected.

22. The method of claim 17 wherein the selection of the transmission is based on at least one quality of service parameter.

23. The method of claim 22 wherein the selection of the transmission from said one of the wireless devices is based on the at least one quality of service parameter provided by said one of the wireless devices on a previously received transmission.

24. The method of claim 17 wherein the reference signals are acquired before the end of a transmission from another one of the wireless devices being used for timing synchronization and decoding before the simultaneously transmissions from the wireless devices.

25. The method of claim 17 further comprising generating an acknowledgement in response to selecting the transmission from said one of the wireless devices, and transmitting the acknowledgement to said one of the wireless devices.

26. The method of claim 25, further comprising generating application-specific data, and wherein transmitting the acknowledgement to said one of the wireless device comprises generating a data frame including both the application-specific data and the acknowledgement, and transmitting the data frame to said one of the wireless devices.

27. The method of claim 26, wherein the application-specific data comprises audio data or data generated by a sensor.

28. The method of claim 17 further comprising transmitting to said one of the wireless devices, receiving an acknowledgement from said one of the wireless devices, and backing off a subsequent transmission in response to the acknowledgement.

29. The method claim 17 wherein the transmission from said one of the wireless devices is selected based on received energy from each of the simultaneous transmissions.

30. The method of claim 17, wherein selecting the transmission is based on a fairness criterion with respect to previously received transmissions from the wireless devices.

31. An apparatus for wireless communications, comprising:
    means for receiving simultaneous transmissions from a plurality of wireless devices via a wireless communication medium, each of the transmissions having a reference signal;
    means for acquiring the reference signals;
    means for distinguishing between the wireless devices by comparing information obtained from the acquisition of the reference signals with information obtained from the acquisition of reference signals of previously received transmissions from the wireless devices, wherein the information being compared comprises delay spread of each reference signal induced by the wireless communication medium;
    means for determining the delay spread by correlating each of the reference signals with a corresponding one of local signals at a plurality of time slots, the delay spread being characterized by a pattern of the time slots at which the correlation exceeds a threshold; and
    means for selecting the transmission from one of the wireless devices for timing synchronization and decoding based on information obtained from the acquisition of the reference signals.

32. The apparatus of claim 31 wherein the reference signal in the transmission from each of the wireless devices includes a preamble sequence unique to that wireless device, and wherein the means for distinguishing between wireless devices is configured to distinguish between the wireless devices based on the preamble sequences.

33. The apparatus of claim 31 wherein the information being compared comprises energy, and wherein the means for distinguishing between wireless devices is configured to distinguish between the wireless devices by comparing the energy from each of the transmissions with the energy from each of the previously received transmissions.

34. The apparatus of claim 31 wherein the information comprises timing, and wherein the means for distinguishing between wireless devices is configured to distinguish between the wireless devices by identifying said one of the wireless devices based on timing of a previously received transmission from the same wireless device.

35. The apparatus of claim 31 wherein the means for selecting the transmission is configured to select the transmission from said one of the wireless devices whose previously received transmission was not selected.

36. The apparatus of claim 31 wherein the means for selecting the transmission is configured to select the transmission based on at least one quality of service parameter.

37. The apparatus of claim 36 wherein the means for selecting the transmission is configured to select the transmission based on the at least one quality of service parameter provided by said one of the wireless devices on a previously received transmission.

38. The apparatus of claim 31 wherein the means for acquiring the reference signals is configured to acquire the reference signals before the end of a transmission from another one of the wireless devices being used for timing synchronization and decoding before the simultaneously transmissions from the wireless devices.

39. The apparatus of claim 31 further comprising means for generating an acknowledgement in response to selecting the transmission from said one of the wireless devices, and means for transmitting the acknowledgement to said one of the wireless devices.

40. The apparatus of claim 39, further comprising means for generating application-specific data, and wherein the means for transmitting is further configured to generate a data frame including both the application-specific data and the acknowledgement, and transmit the data frame to said one of the wireless devices.

41. The apparatus of claim 40, wherein the application-specific data comprises audio data or data generated by a sensor.

42. The apparatus of claim 31 further comprising means for transmitting to a receiving one of the wireless devices, means for receiving an acknowledgement from said receiving one of the wireless devices, and means for backing off a subsequent transmission in response to the acknowledgement.

43. The apparatus of claim 31 wherein the means for selecting the transmission is configured to select the transmission based on received energy from each of the simultaneous transmissions.

44. The apparatus of claim 31, wherein the means for selecting is further configured to select the transmission based on a fairness criterion with respect to previously received transmissions from the wireless devices.

45. A non-transitory computer-readable medium embodied as a computer-program product for wireless communications comprising simultaneous transmissions received from a plurality of wireless devices via a wireless communication medium, each of the transmissions having a reference signal, the computer-program product, comprising: codes executable by at least one processor to:
  acquire the reference signals;
  distinguish between the wireless devices by comparing the information obtained from the acquisition of the reference signals with information obtained from the acquisition of reference signals of previously received transmissions from the wireless devices, wherein the information being compared comprises delay spread of each reference signal induced by the wireless communication medium;
  determine the delay spread by correlating each of the reference signals with a corresponding one of local signals at a plurality of time slots, the delay spread being characterized by a pattern of the time slots at which the correlation exceeds a threshold; and
  select the transmission from one of the wireless devices for timing synchronization and decoding based on information obtained from the acquisition of the reference signals.

46. A headset, comprising:
  a wireless interface configured to receive simultaneous transmissions from a plurality of wireless devices via a wireless communication medium, each of the transmissions having a reference signal;
  a searcher configured to:
    acquire the reference signals;
    distinguish between the wireless devices by comparing the information obtained from the acquisition of the reference signals with information obtained from the acquisition of reference signals of previously received transmissions from the wireless devices, wherein the information being compared comprises delay spread of each reference signal induced by the wireless communication medium;
    determine the delay spread by correlating each of the reference signals with a corresponding one of local signals at a plurality of time slots, the delay spread being characterized by a pattern of the time slots at which the correlation exceeds a threshold;
    based on information obtained from the acquisition of the reference signals, select the transmission from one of the wireless devices for timing synchronization and decoding; and
  a transducer configured to provide an audio output based on the selected transmission.

47. A watch comprising:
  a wireless interface configured to receive simultaneous transmissions from a plurality of wireless devices via a wireless communication medium, each of the transmissions having a reference signal;
  a searcher configured to:
    acquire the reference signals;
    distinguish between the wireless devices by comparing the information obtained from the acquisition of the reference signals with information obtained from the acquisition of reference signals of previously received transmissions from the wireless devices, wherein the information being compared comprises delay spread of each reference signal induced by the wireless communication medium;
    determine the delay spread by correlating each of the reference signals with a corresponding one of local signals at a plurality of time slots, the delay spread being characterized by a pattern of the time slots at which the correlation exceeds a threshold; and
    based on information obtained from the acquisition of the reference signals, select the transmission from one of the wireless devices for timing synchronization and decoding; and
  a user interface configured to provide an indication based on the selected transmission.

48. A sensing device for wireless communications, comprising:
  a wireless interface configured to receive simultaneous transmissions from a plurality of wireless devices via a wireless communication medium, each of the transmissions having a reference signal;
  a searcher configured to:
    acquire the reference signals;
    distinguish between the wireless devices by comparing the information obtained from the acquisition of the reference signals with information obtained from the acquisition of reference signals of previously received transmissions from the wireless devices, wherein the information being compared comprises delay spread of each reference signal induced by the wireless communication medium;
    determine the delay spread by correlating each of the reference signals with a corresponding one of local signals at a plurality of time slots, the delay spread being characterized by a pattern of the time slots at which the correlation exceeds a threshold; and
  based on information obtained from the acquisition of the reference signals, select the transmission from one of the wireless devices for timing synchronization and decoding; and
  a sensor configured to provide data to the wireless interface for transmission.

* * * * *